United States Patent
Wakamatsu

(10) Patent No.: US 8,965,188 B2
(45) Date of Patent: Feb. 24, 2015

(54) SHAKE CORRECTION APPARATUS AND CONTROL METHOD THEREOF

(71) Applicant: Canon Kabushiki Kaisha, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/048,469

(22) Filed: Oct. 8, 2013

(65) Prior Publication Data

US 2014/0037279 A1    Feb. 6, 2014

Related U.S. Application Data

(63) Continuation of application No. 13/722,090, filed on Dec. 20, 2012, now Pat. No. 8,577,214, which is a continuation of application No. 13/009,521, filed on Jan. 19, 2011, now Pat. No. 8,351,772.

(30) Foreign Application Priority Data

Feb. 5, 2010    (JP) .................................. 2010-024827

(51) Int. Cl.
G03B 17/00    (2006.01)
G02B 27/64    (2006.01)
G03B 5/00    (2006.01)
(Continued)

(52) U.S. Cl.
CPC .............. *G02B 27/646* (2013.01); *G03B 5/00* (2013.01); *G03B 5/02* (2013.01); *H04N 5/23258* (2013.01); *H04N 5/23287* (2013.01); *G02B 27/64* (2013.01); *G03B 2217/005* (2013.01)
USPC ............. 396/52; 396/55; 359/554; 348/208.4

(58) Field of Classification Search
USPC ......... 396/52–55; 348/208.2, 208.4; 359/554, 359/557
See application file for complete search history.

(56) References Cited

U.S. PATENT DOCUMENTS 6,393,215 B1 * 5/2002 Washisu .......................... 396/52
6,414,715 B1    7/2002 Sato
(Continued)

FOREIGN PATENT DOCUMENTS

EP    0481230 A2    4/1992
EP    1708019 A2    10/2006
(Continued)

OTHER PUBLICATIONS

Jan. 17, 2014 Japanese Office Action that issued in Japanese Patent Application No. 2010-024827.
(Continued)

*Primary Examiner* — Christ Mahoney
(74) *Attorney, Agent, or Firm* — Cowan, Liebowitz & Latman, P.C.

(57) ABSTRACT

A shake correction apparatus comprises a shake detection unit which detects a shake of an image capture apparatus, a calculation unit which calculates a shake correction amount for correcting an image blur based on an output from the shake detection unit, a shake correction unit which corrects the image blur based on the shake correction amount, a shake level determination unit which determines a shake level of the image capture apparatus based on an output from the shake detection unit, an offset determination unit which determines an offset value based on the shake correction amount and the shake level, and a subtraction unit which subtracts the offset value from the output from the shake detection unit.

16 Claims, 10 Drawing Sheets

(51) Int. Cl.
*G03B 5/02* (2006.01)
*H04N 5/232* (2006.01)

(56) References Cited

U.S. PATENT DOCUMENTS

| | | | |
|---|---|---|---|
| 6,940,542 B2 * | 9/2005 | Kitazawa et al. | 348/208.99 |
| 7,292,270 B2 * | 11/2007 | Higurashi et al. | 348/208.3 |
| 7,787,018 B2 * | 8/2010 | Hatanaka et al. | 348/208.2 |
| 7,848,627 B2 * | 12/2010 | Uenaka | 396/53 |
| 8,351,772 B2 * | 1/2013 | Wakamatsu | 396/55 |
| 8,577,214 B2 * | 11/2013 | Wakamatsu | 396/52 |
| 2004/0189815 A1 | 9/2004 | Kumaki | |
| 2006/0083502 A1 | 4/2006 | Higo | |
| 2007/0009242 A1 | 1/2007 | Okada | |
| 2007/0166021 A1 | 7/2007 | Yamazaki | |
| 2011/0013031 A1 * | 1/2011 | Miyasako | 348/208.99 |

FOREIGN PATENT DOCUMENTS

| | | |
|---|---|---|
| EP | 2200273 A1 | 6/2010 |
| JP | 2-246680 A | 10/1990 |
| JP | 102822536 A | 10/1998 |
| JP | 2004-294571 A | 10/2004 |
| JP | 2007189478 A | 7/2007 |

OTHER PUBLICATIONS

Japanese Office Action dated Sep. 20, 2013, issued in Japanese Patent Application No. 2009-167266.

* cited by examiner

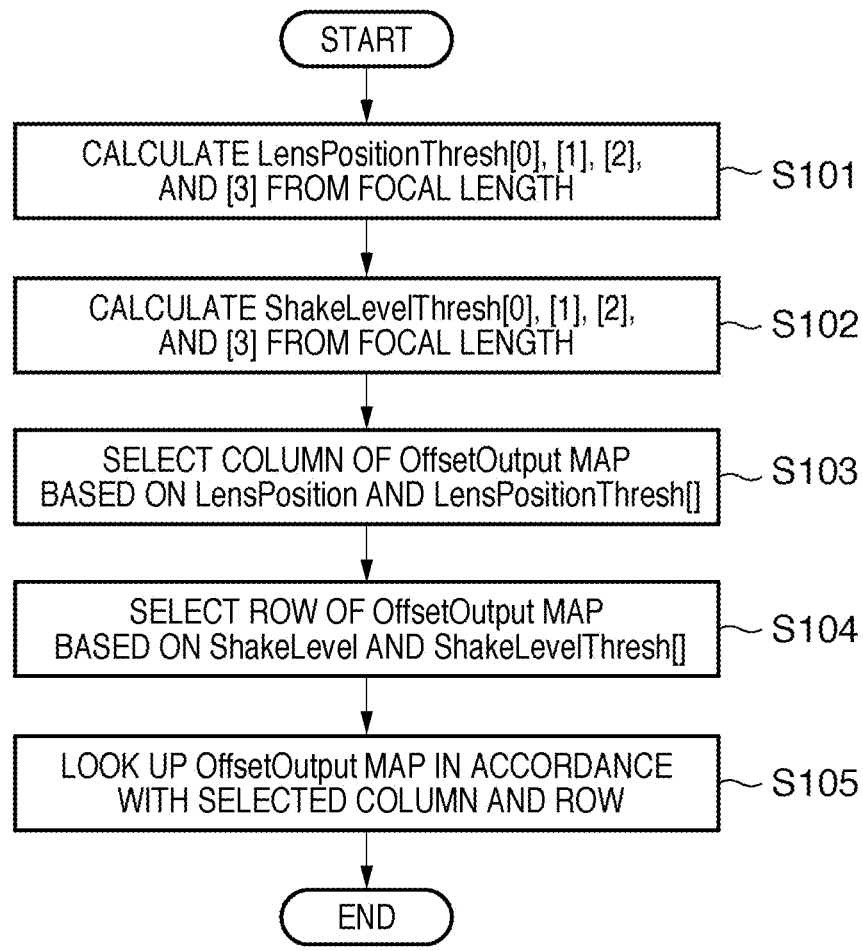

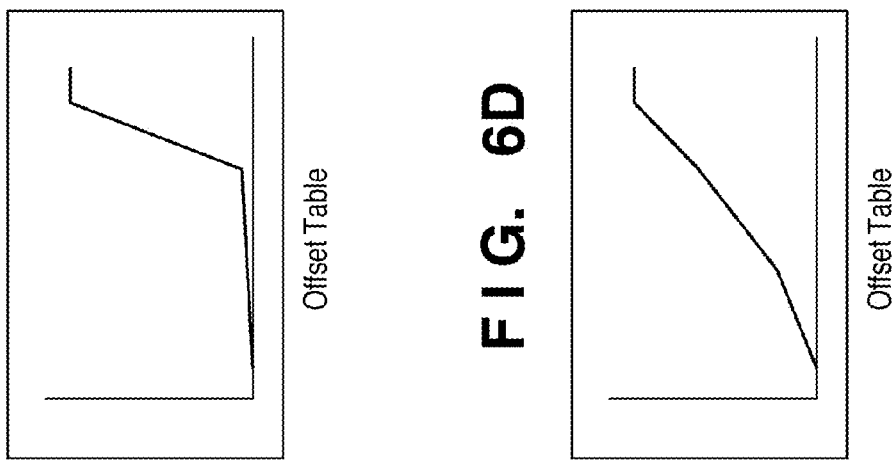
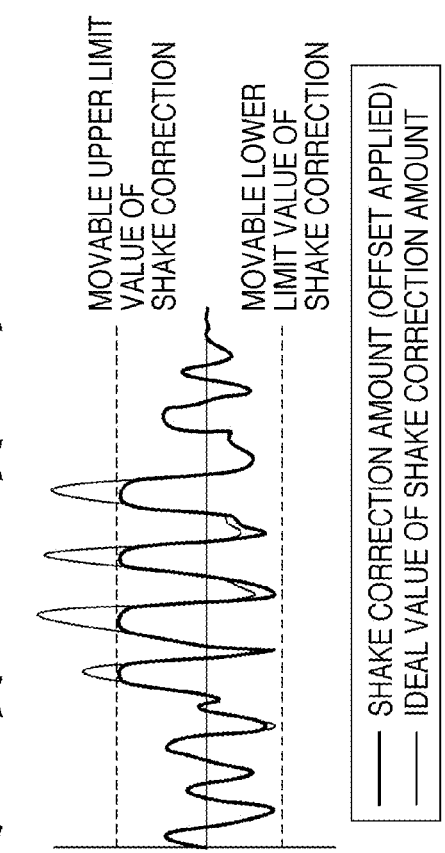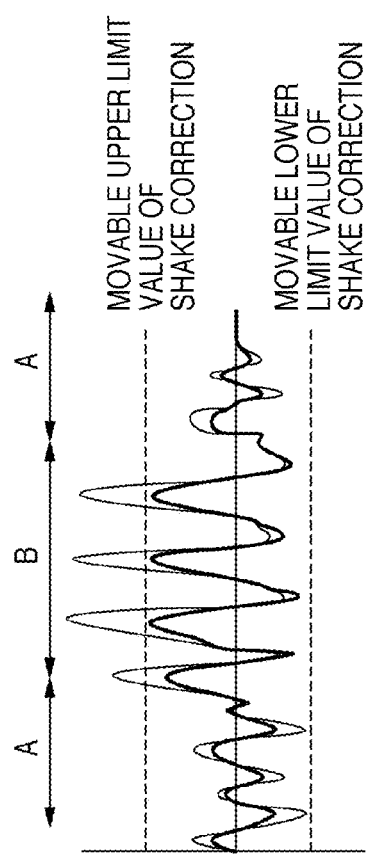

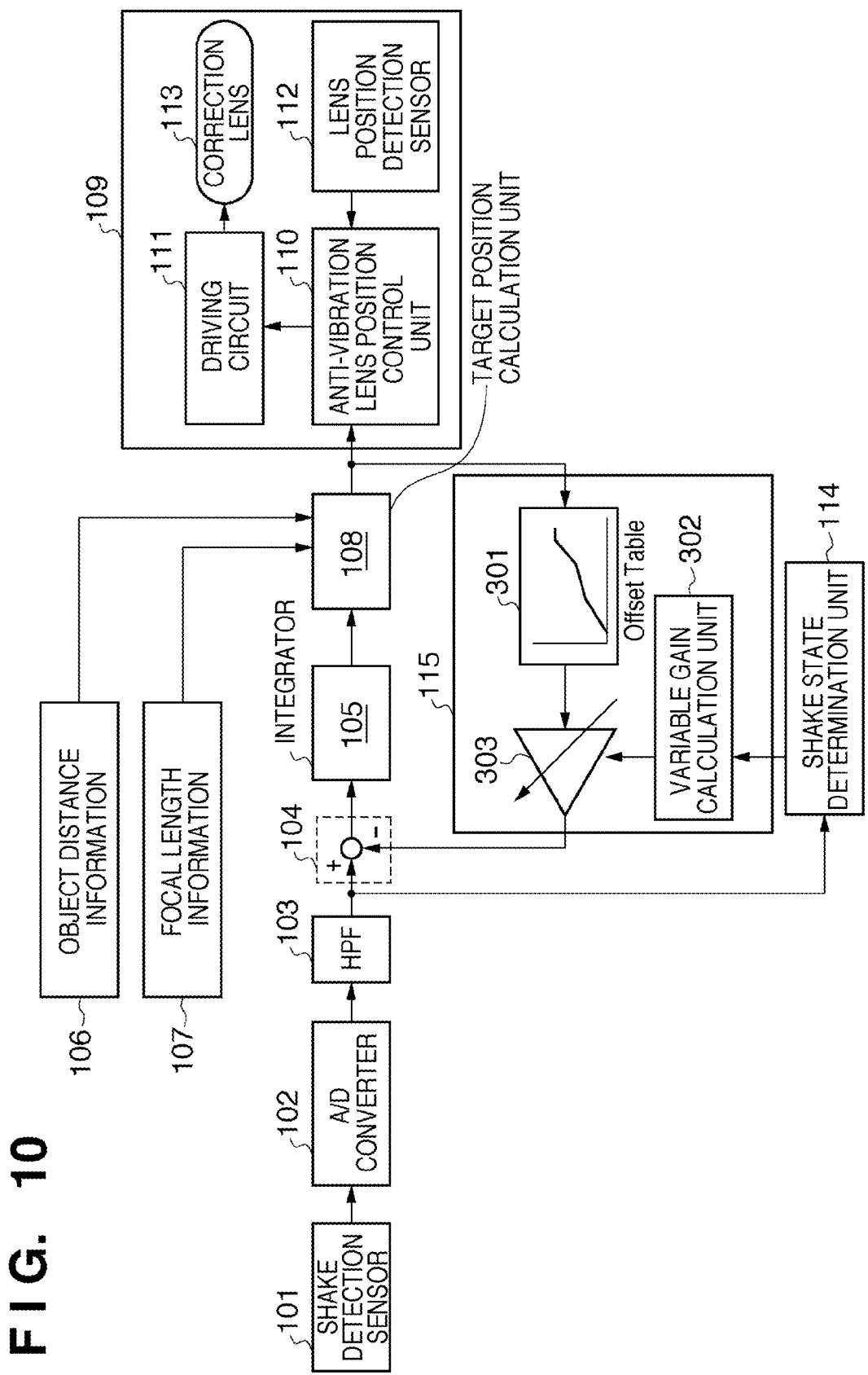

SHAKE CORRECTION APPARATUS AND CONTROL METHOD THEREOF

CROSS-REFERENCE TO RELATED APPLICATIONS

This application is continuation of application Ser. No. 13/722,090, filed Dec. 20, 2012, which is a continuation of application Ser. No. 13/009,521, filed Jan. 19, 2011, now U.S. Pat. No. 8,351,772, the entire disclosures of which are hereby incorporated by reference.

BACKGROUND OF THE INVENTION

1. Field of the Invention

The present invention relates to an image stabilizing technique against the blur of a captured image caused by the motion of an image capture apparatus.

2. Description of the Related Art

Recently, as image capture apparatuses are becoming more compact with a larger number of pixels and higher magnification of the zoom lens, the motion of the image capture apparatus during exposure, called camera shake, is becoming a serious cause of degrading the quality of a captured image. There has been proposed a shake correction apparatus which reduces the influence of camera shake on a captured image.

For example, Japanese Patent No. 3186219 discloses a method of suppressing the response characteristic of a shake correction function with respect to the frequency component of panning when it is determined that the image capture apparatus is panned, that is, moved intentionally. However, the frequency band of the panning operation is about DC to 1 Hz, and is very close to a frequency band of 1 Hz to 10 Hz for the camera shake and body swing. Thus, the following problem arises in the conventional technique disclosed in Japanese Patent No. 3186219.

More specifically, even a signal having the frequency component of the camera shake or the body swing during walking or the like is greatly attenuated, impairing the shake correction effect.

Especially in image capturing during walking, a shake generated by the body swing is transmitted to the image capture apparatus, increasing the shake amplitude. It becomes difficult to determine whether the image capture apparatus is intentionally moved for panning, or a shake is generated by the body swing during walking.

SUMMARY OF THE INVENTION

The present invention has been made to solve the above problems, and suppresses degradation of the shake correction effect even when the amplitude of camera shake in image capturing during walking or the like is large.

According to a first aspect of the present invention, there is provided a shake correction apparatus comprising: a shake detection unit which detects a shake of an image capture apparatus; a calculation unit which calculates a shake correction amount for correcting an image blur based on an output from the shake detection unit; a shake correction unit which corrects the image blur based on the shake correction amount; a shake level determination unit which determines a shake level of the image capture apparatus based on an output from the shake detection unit; an offset determination unit which determines an offset value based on the shake correction amount and the shake level; and a subtraction unit which subtracts the offset value from the output from the shake detection unit.

According to a second aspect of the present invention, there is provided a method of controlling a shake correction apparatus including a shake correction unit which corrects an image blur, the method comprising: a shake detection step of detecting a shake of an image capture apparatus; a calculation step of calculating a shake correction amount for correcting an image blur based on an output from the shake detection step; a shake correction step of driving the shake correction unit based on the shake correction amount; a shake level determination step of determining a shake level of the image capture apparatus based on an output from the shake detection step; an offset determination step of determining an offset value based on the shake correction amount and the shake level; and a subtraction step of subtracting the offset value from the output from the shake detection step.

Further features of the present invention will become apparent from the following description of exemplary embodiments with reference to the attached drawings.

BRIEF DESCRIPTION OF THE DRAWINGS

FIG. 4 is a flowchart for explaining processing by the offset calculation unit shown in FIG. 1;

FIG. 5 is a table for explaining processing by the offset calculation unit shown in FIG. 1;

FIGS. 6A to 6D are views for explaining the effect of the shake correction apparatus in the first embodiment;

FIG. 10 is a block diagram showing the arrangement of a shake correction apparatus according to the third embodiment.

DESCRIPTION OF THE EMBODIMENTS

First Embodiment

Figure 1:
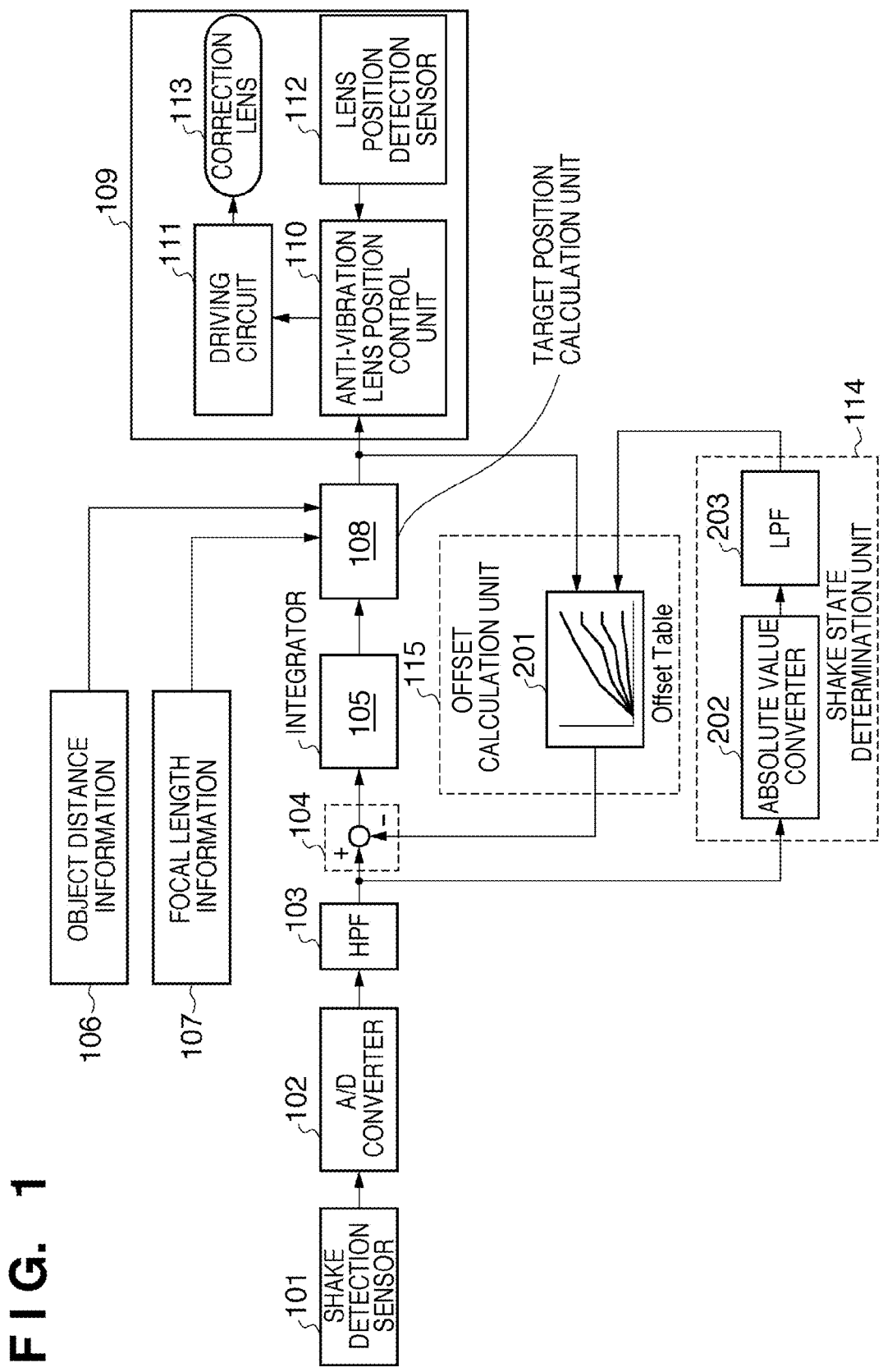
FIG. 1 is a block diagram showing the arrangement of a shake correction apparatus according to the first embodiment of the present invention.

FIG. 1 is a block diagram showing the arrangement of a shake correction apparatus according to the first embodiment of the present invention. The following embodiments assume a case in which an image capture apparatus such as a digital camera uses the shake correction apparatus.

A shake detection sensor 101 which detects the shake of the shake correction apparatus and outputs shake information is an angular velocity sensor in the embodiment. The shake detection sensor 101 is attached to the shake correction apparatus or the main body of the image capture apparatus (not shown). The shake detection sensor 101 detects a shake applied to the apparatus, and detects the magnitude of the shake as an angular velocity. An A/D (Analog/Digital) converter 102 converts an angular velocity signal (output value from the shake detection sensor 101) into a digital angular velocity signal, and outputs the digital angular velocity signal. An HPF (High-Pass Filter) 103 removes low-frequency components equal to or lower than a set low cutoff frequency out of the frequency components of the digital angular velocity signal output from the A/D converter 102, and outputs high-frequency components exceeding the low cutoff frequency.

A subtracter 104 subtracts, from the angular velocity signal output from the HPF 103, an output from an offset calculation unit 115. More specifically, a shake state determination unit (shake level determination unit) 114 outputs, as a shake level, an amount indicating the shake state of the image capture apparatus based on the angular velocity signal output from the HPF 103. The offset calculation unit 115 generates a signal for returning the shake correction amount to the correction center position in accordance with the shake level and a shake correction amount (output data of sampling of one preceding cycle) calculated by a target position calculation unit 108. Then, the offset calculation unit 115 outputs the signal to the subtracter 104. Details of the operations of the shake state determination unit 114 and offset calculation unit 115 will be described later.

An integrator 105 integrates the high-frequency components of the offset amount-subtracted angular velocity output from the subtracter 104, and outputs the integral result as an angle signal. The target position calculation unit 108 calculates a shake correction amount for correcting the shake of the optical axis of an image sensor, based on object distance information 106 and focal length information 107 of the zoom lens of the image capture apparatus (not shown), and the angle amount output from the integrator 105. A shake correction unit 109 corrects the shake of the optical axis of the image capture apparatus in accordance with the shake correction amount.

Note that the shake correction unit 109 in the embodiment decenters the optical axis by driving a correction lens 113 of the correction optical system serving as part of the imaging optical system (lens unit) in a direction perpendicular to the optical axis in accordance with the shake correction amount. As a result, the shake correction unit 109 functions as an optical shake correction unit which corrects the blur of a captured image. The shake correction unit 109 may also be an electronic shake correction unit which corrects the image blur by moving the readout region of the image sensor of the image capture apparatus in accordance with the shake correction amount. Alternatively, the shake correction unit 109 may be a sensor shift shake correction unit which moves the image sensor within a plane perpendicular to the optical axis in accordance with the shake correction amount.

In this case, the correction lens 113 needs to be driven to correct the shake of the optical axis of the image sensor in accordance with the shake correction amount from the target position calculation unit 108. For this purpose, an anti-vibration lens position control unit 110 feedback-controls the position of the correction lens 113 that is detected by a lens position detection sensor 112. A driving circuit 111 drives the correction lens 113 by the shake correction amount from the target position calculation unit 108.

Next, the operations of the shake state determination unit 114 and offset calculation unit 115 in the first embodiment will be explained.

The shake state determination unit 114 outputs, as a shake level, an amount indicating the shake state of the image capture apparatus based on an angular velocity signal output from the HPF 103. The offset calculation unit 115 generates a signal for returning the shake correction amount to the correction center position in accordance with the shake level and a shake correction amount (output data of sampling of one preceding cycle) calculated by the target position calculation unit 108. Then, the offset calculation unit 115 outputs the signal to the subtracter 104.

Calculation executed in the shake state determination unit 114 will be described. An absolute value converter (absolute value calculation unit) 202 outputs the absolute value of an angular velocity output from the HPF 103. An LPF (Low-Pass Filter) 203 removes high-frequency components exceeding a set cutoff frequency out of the signal frequency components of the absolute value of the angular velocity output from the absolute value converter 202, and outputs low-frequency components equal to or lower than the cutoff frequency.

Figure 2A:
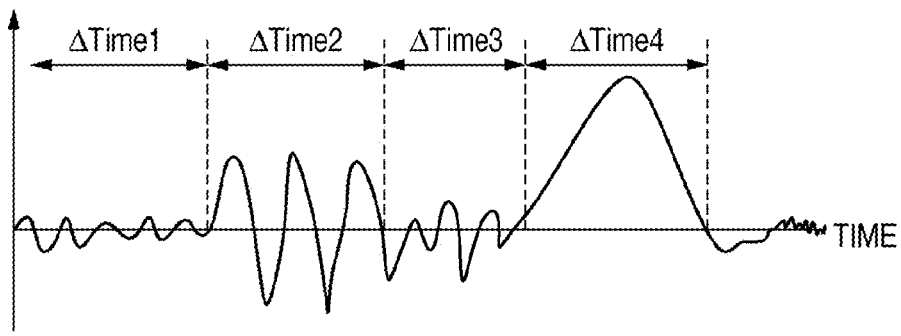
FIGS. 2A to 2C are graphs showing time-series data of a shake level calculated by the shake state determination unit of the shake correction apparatus shown in FIG. 1.
Figure 2B:
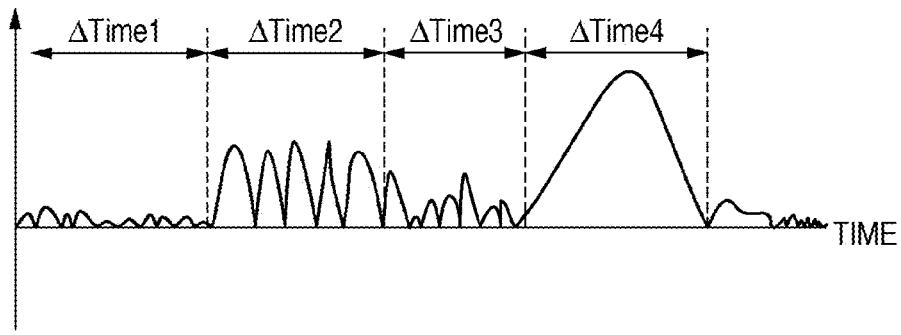
Figure 2C:
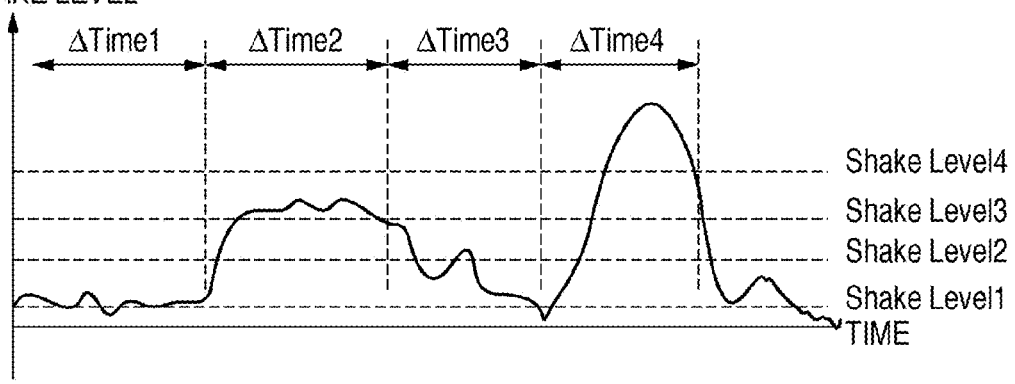

FIGS. 2A to 2C show time-series data of a shake level calculated by the shake state determination unit 114. FIG. 2A shows an angular velocity signal output from the HPF 103. FIG. 2B shows the absolute value of the angular velocity output from the absolute value converter 202. FIG. 2C shows a shake level output from the LPF 203. The amplitude of the detected angular velocity is small during time ΔTime1, and the camera shake is small as if the user captured an image while holding the image capture apparatus with his hands intentionally not to shake it. The amplitude of the detected angular velocity is large during time ΔTime2, and the camera shake is very large owing to image capturing during walking or the like. During time ΔTime3, the amplitude of the angular velocity is an intermediate one between the amplitude during ΔTime1 and that during ΔTime2. During time ΔTime4, the user intentionally moves (pans or tilts) the image capture apparatus to, for example, change its composition.

In this way, a shake level signal as shown in FIG. 2C can be detected by the control block in FIG. 1, and it can be detected whether the shake is large in an image capturing state such as image capturing during walking.

From the shake level calculated in the above manner, and the shake correction amount of sampling of one preceding cycle, the offset calculation unit 115 calculates and generates a signal for returning the shake correction amount to the correction center position. The offset calculation unit 115 in the first embodiment calculates and outputs an offset signal for returning the shake correction amount to the correction center position, by using an offset table 201 based on the two inputs, that is, the calculated shake level and the shake correction amount of sampling of one cycle.

Figure 3A:
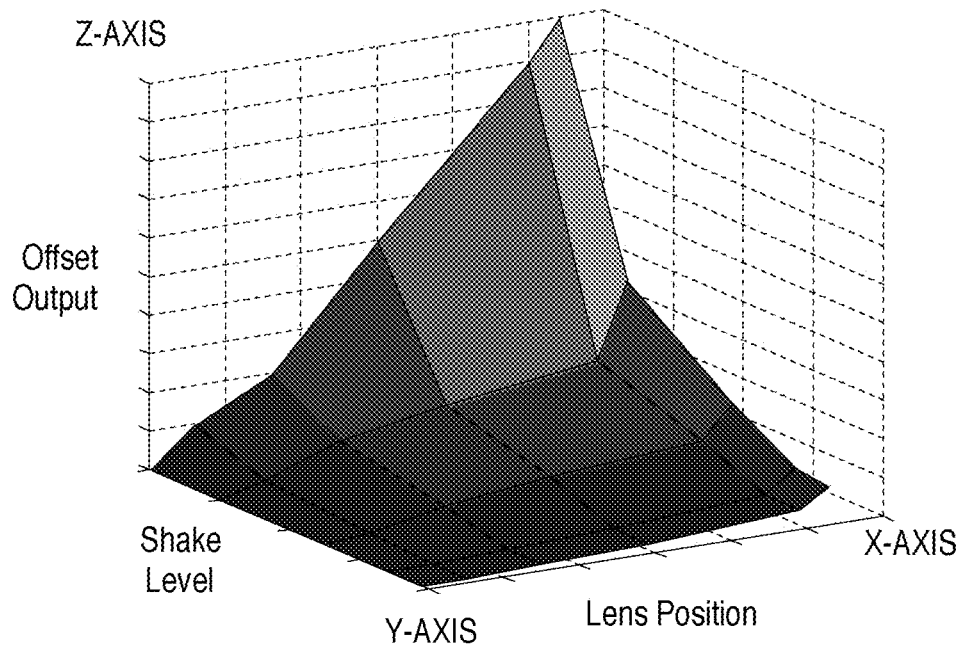
FIGS. 3A and 3B are graphs for explaining processing by an offset calculation unit shown in FIG. 1.
Figure 3B:
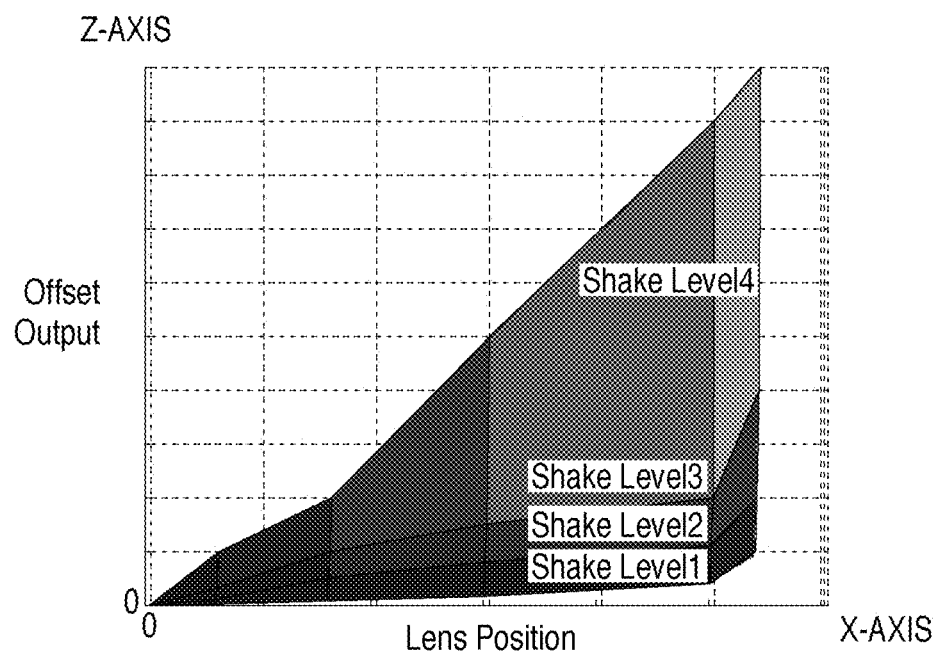

FIGS. 3A and 3B exemplify the offset table 201 in the offset calculation unit 115. FIG. 3A is a 3D graph of an offset table which outputs an offset signal Offset Output set along the Z-axis in accordance with two inputs, that is, a shake correction amount Lens Position set along the X-axis and a shake level Shake Level set along the Y-axis. FIG. 3B shows an offset table whose input is the shake correction amount Lens Position along the X-axis and whose output is the offset signal Offset Output along the Z-axis. As shown in FIG. 2C, several shake level thresholds Shake Level 1, Shake Level 2, Shake Level 3, and Shake Level 4 are set in advance. By looking up the table of the shake correction amount input and offset signal output in accordance with the shake level, as shown in FIG. 3B, an offset value is calculated by linear interpolation and output.

FIG. 4 is a flowchart showing a method of calculating an output from the offset table 201 in the offset calculation unit 115. FIG. 5 shows an offset table map. Note that processing to be described below with reference to FIG. 4 is repetitively executed in every sampling cycle during a predetermined period.

In step S101, the offset calculation unit 115 calculates four threshold points for the shake correction amount (output data of sampling of one preceding cycle), based on the focal length information 107. The four threshold points are LensPosition-Thresh[0], LensPositionThresh[1], LensPositionThresh[2], and LensPositionThresh[3].

In step S102, the offset calculation unit 115 calculates four threshold points for a shake level output from the shake state determination unit 114, based on the focal length information 107. The four threshold points are ShakeLevelThresh[0], ShakeLevelThresh[1], ShakeLevelThresh[2], and ShakeLevelThresh[3].

In step S103, the offset calculation unit 115 compares the shake correction amount LensPosition of one preceding cycle with the four calculated threshold points LensPosition-Thresh, and sets a column to be looked up in the offset table map of FIG. 5. At this time, when the shake correction amount LensPosition of one preceding cycle is positioned between LensPositionThresh[1] and LensPositionThresh[2], column 2 is selected.

In step S104, the offset calculation unit 115 compares the shake level ShakeLevel with the four calculated threshold points ShakeLevelThresh, and sets a row to be looked up in the offset table map of FIG. 5. At this time, when the shake level ShakeLevel is a value equal to or larger than ShakeLevelThresh[3], row D is selected.

In step S105, the offset calculation unit 115 calculates an offset value OffsetOutput by looking up the offset table map of FIG. 5 in accordance with the column and row set in steps S103 and S104. Since the column is 2 and the row is D in the above example, D2 is selected and output as the output value OffsetOutput.

In the above example, the offset table map is directly looked up. However, it is desirable to interpolate the interval between values set in the offset table and output an offset value.

Control in the first embodiment will be explained with reference to FIGS. 6A to 6D and 7A to 7D. FIGS. 6A to 6D exemplify a case in which the shake state is not determined, an offset value is output by uniformly looking up the same offset table based on only the shake correction amount, and image stabilizing control is performed.

FIG. 6A shows time-series data of an ideal shake correction amount when the shake of the image capture apparatus that is detected by the shake detection sensor 101 is ideally corrected, and time-series data of a shake correction amount when the offset in FIG. 6B is applied. In range A, the difference between the ideal value of the shake correction amount and the offset-applied shake correction amount is small, and a satisfactory image stabilizing effect is obtained. However, in range B, the shake is generated to exceed the movable range of shake correction and cannot be ideally corrected. The offset table in FIG. 6B is set so that the offset amount is very small for a small shake correction amount and abruptly increases from a range where the shake correction amount greatly increases. This condition is preferable when the shake correction amount is small as in range A because the correction effect is obtained. However, in range B where the shake may be generated to exceed the movable range of image blur correction such as image stabilizing in, for example, moving image capturing during walking, a man feels the shake caused by the image blur of the image sensor to be more uncomfortable under this condition. This is because the shake hardly remains thanks to the image stabilizing effect up to a given shake correction range, but when the shake exceeds the given shake correction range, it cannot be corrected suddenly. In other words, the differential value of the difference between the ideal value of the shake correction amount and the shake correction amount, that is, the magnitude of the motion vector of the image on the image sensor abruptly changes from a given range. As a result, the shake speed or shake acceleration greatly increases, and a man feels the shake to be more uncomfortable when he views the image.

FIG. 6C shows time-series data of an ideal shake correction amount when the shake of the image capture apparatus that is detected by the shake detection sensor 101 is ideally corrected, and time-series data of a shake correction amount when the offset in FIG. 6D is applied. The offset table in FIG. 6D is set so that the offset amount gradually increases from a small shake correction amount to a large one not to abruptly increase the offset amount from a given range of the shake correction amount. In range A, the offset-applied shake correction amount is smaller than the ideal value of the shake correction amount owing to the influence of the offset, and the shake remains. Even in range B, the shake is generated to exceed the movable range of image blur correction, and the shake remains by the difference between the offset-applied shake correction amount and the ideal value of the shake correction amount. However, unlike FIG. 6A, the offset value to return to the center does not abruptly increase even if the shake correction amount exceeds a given image blur correction range. The difference between the ideal value of the shake correction amount and the shake correction amount increases gradually. This prevents an abrupt change of the differential value of the difference between the ideal value of the shake correction amount and the shake correction amount, that is, the motion vector of the image on the image sensor. Hence, when a man views the image in range B, he feels the shake to be less uncomfortable in FIG. 6C than in FIG. 6A.

From this, as the offset table, a table which gradually increases the offset amount from a small shake correction amount to a large one, like FIG. 6D, is preferable to a table which abruptly changes the offset amount from a given range, like FIG. 6B.

However, if the gradient of the offset table is excessively gradual in a table as shown in FIG. 6D, the image blur exceeds the movable range of image blur correction in range B. To the contrary, if the gradient of the offset table is excessively steep, the remaining amount of the image blur in range A becomes large, impairing the shake reduction effect.

Figure 7A:
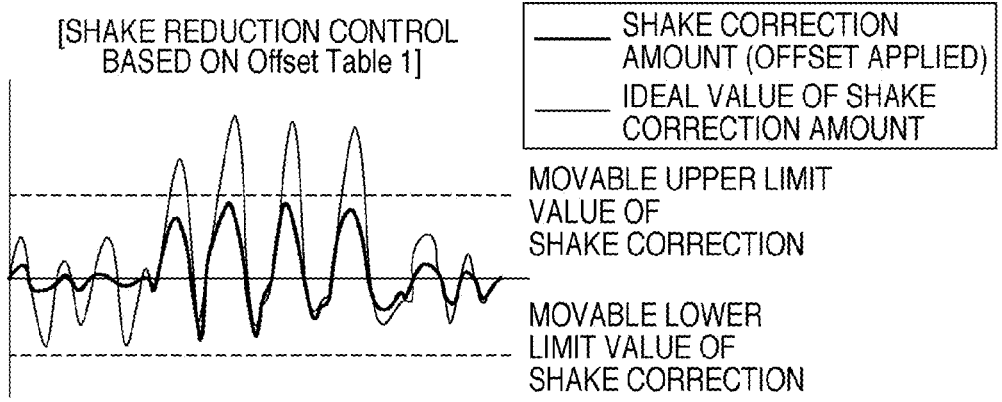
FIGS. 7A to 7D are views for explaining the effect of the shake correction apparatus in the first embodiment.

Considering this, the effects of the shake correction apparatus in the first embodiment will be explained with reference to FIGS. 7A to 7D. FIG. 7A shows time-series data of an ideal shake correction amount when the shake of the image capture apparatus that is detected by the shake detection sensor 101 is ideally corrected, and time-series data of a shake correction amount when Offset Table 1 in the offset table of FIG. 7D is applied. Offset Table 1 in the offset table of FIG. 7D sets a relatively large offset amount. When the shake amount is small, the shake reduction effect becomes weak, leaving the shake. However, when the camera shake is larger than the movable range of image blur correction, it is optimally controlled within the range of image blur correction.

Figure 7B:
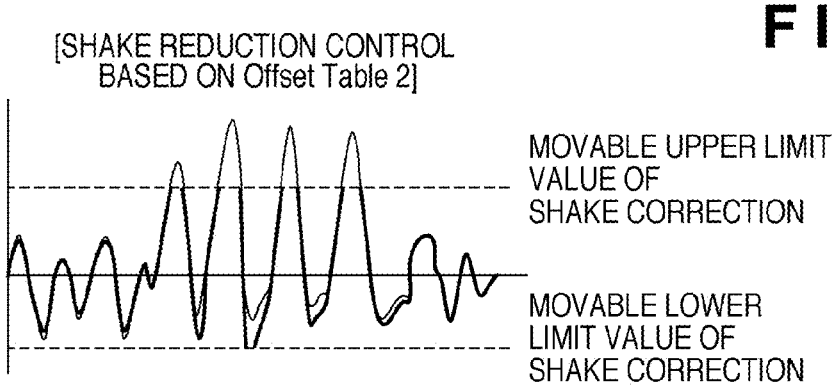
Figure 7C:
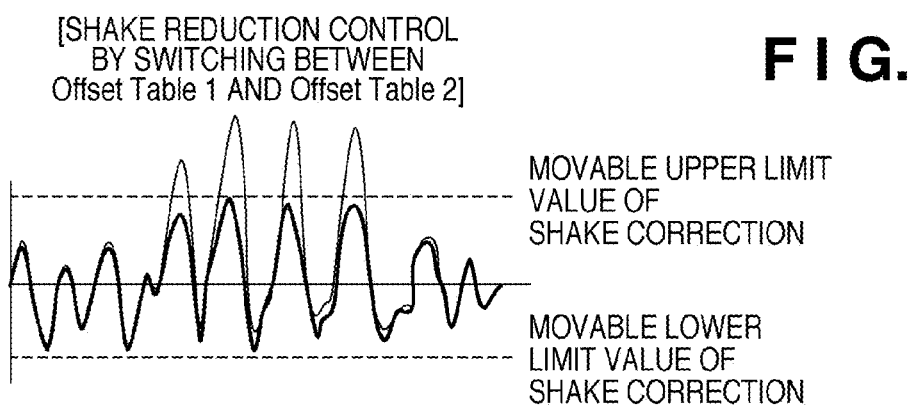
Figure 7D:
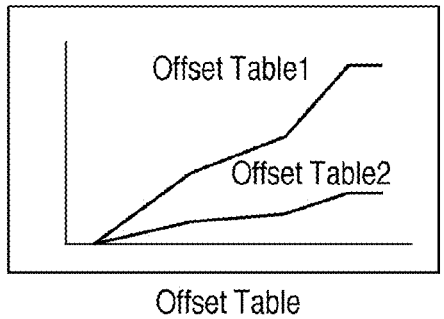

FIG. 7B shows time-series data of an ideal shake correction amount when the shake of the image capture apparatus that is detected by the shake detection sensor 101 is ideally corrected, and time-series data of a shake correction amount when Offset Table 2 in the offset table of FIG. 7D is applied. Offset Table 2 in the offset table of FIG. 7D sets a relatively small offset amount. When the shake amount is small, the shake reduction effect is good, hardly leaving the shake. However, when the camera shake is larger than the movable range of shake correction, it is clamped at the upper and lower limit values of the movable range of shake correction, impairing the image stabilizing effect.

FIG. 7C shows time-series data of an ideal shake correction amount when the shake of the image capture apparatus that is detected by the shake detection sensor 101 is ideally corrected, and time-series data of a shake correction amount when control to switch between Offset Table 1 and Offset Table 2 in the offset table of FIG. 79 is applied. Offset Table 1 and Offset Table 2 are switched in accordance with a shake level calculated by the shake state determination unit 114. In a time period during which the shake is small, Offset Table 2 is applied to enhance the shake reduction effect and hardly leave the image blur. In a time period during which the shake is large, Offset Table 1 is applied to optimally control the shake within the movable range of image blur correction.

In this fashion, according to the first embodiment, several set offset tables are switched in accordance with a shake level calculated from the angular velocity. The shake correction effect can be optimized within the movable range of image blur correction in both a state in which the shake is large during walking or the like, and a state in which the shake is small.

Second Embodiment

Figure 8:
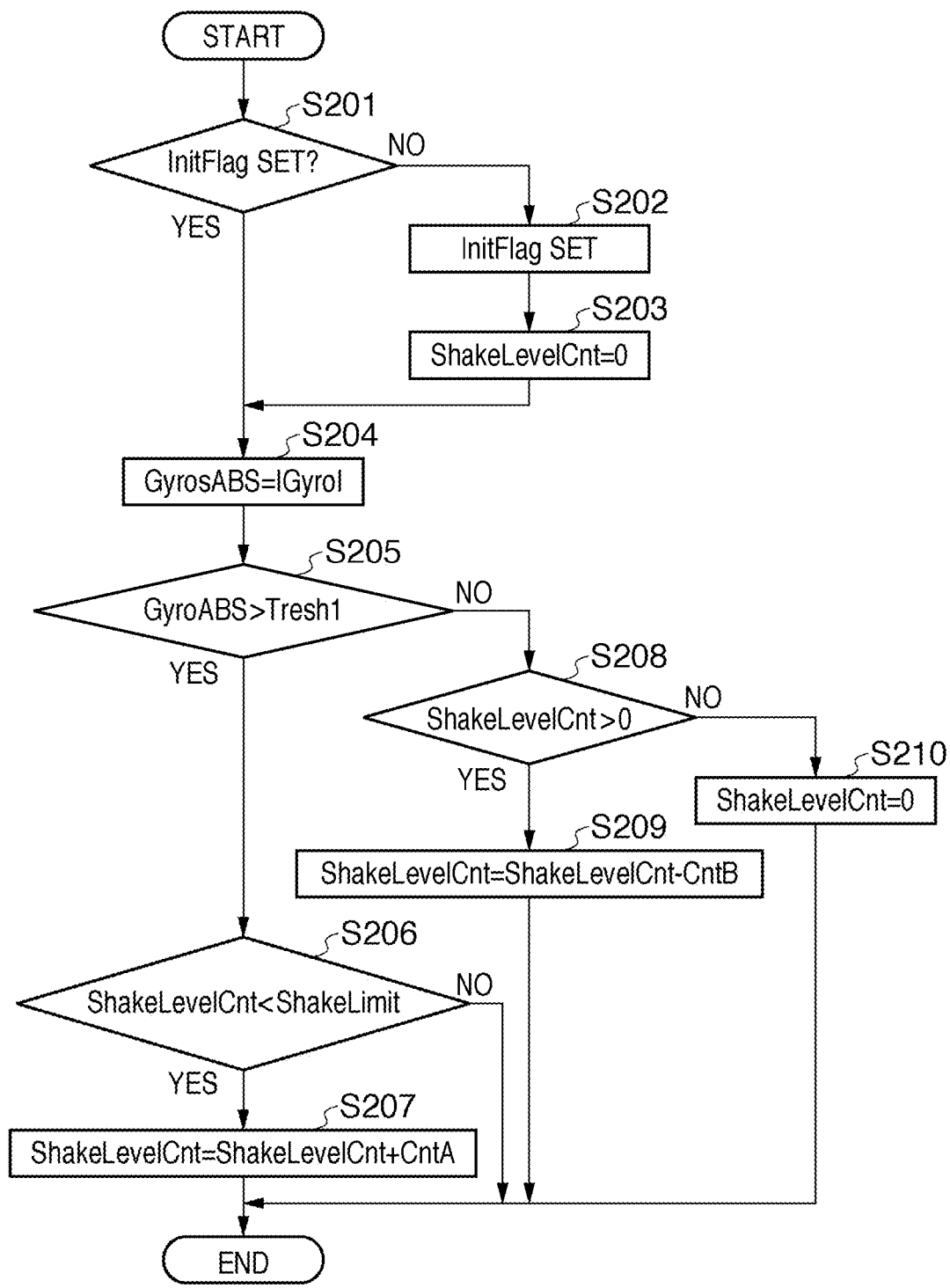
FIG. 8 is a flowchart showing processing by the shake state determination unit of a shake correction apparatus in the second embodiment.
Figure 9A:
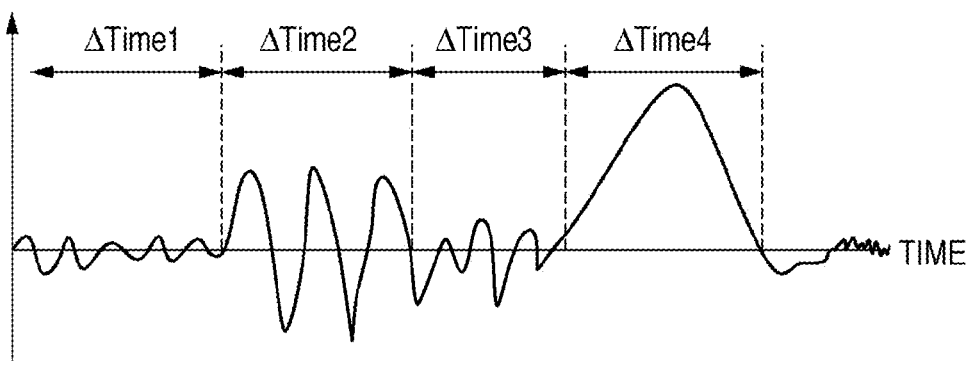
FIGS. 9A to 9C are graphs showing time-series data of a shake level calculated by the shake state determination unit of the shake correction apparatus shown in FIG. 8.
Figure 9B:
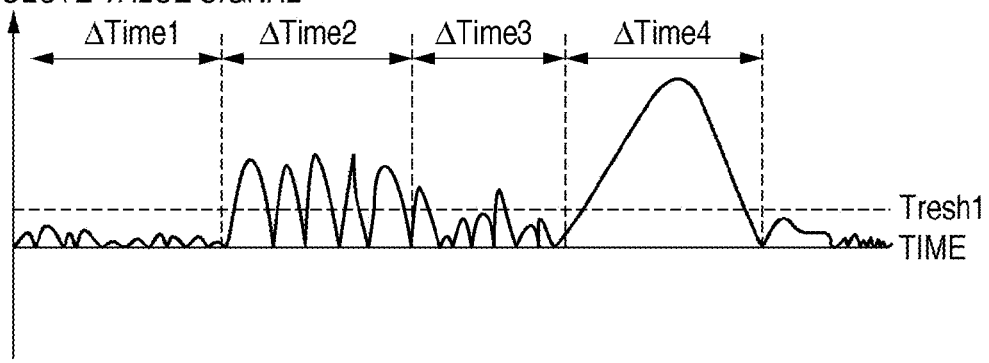
Figure 9C:
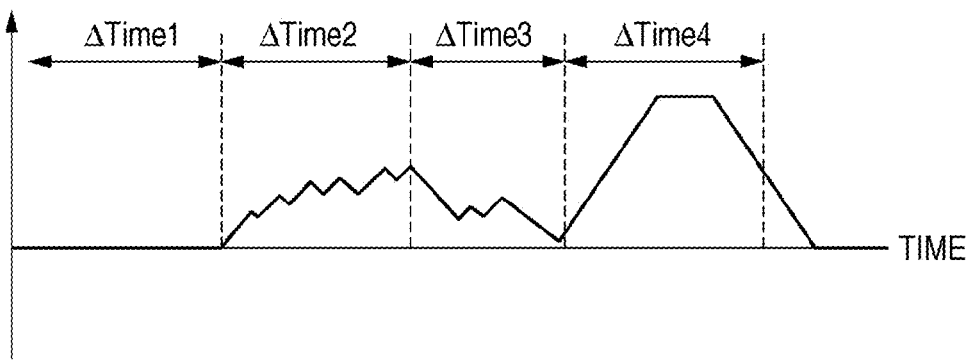

The operation of a shake state determination unit 114 in the second embodiment of the present invention will be described. FIG. 8 is a flowchart showing the internal operation of the shake state determination unit 114 in the second embodiment. FIGS. 9A to 9C show time-series data of a shake level calculated by the shake state determination unit 114 in the second embodiment. Note that processing to be described below with reference to FIG. 8 is repetitively executed in every sampling cycle during a predetermined period.

In step S201, the shake state determination unit 114 determines whether InitFlag has been set. If InitFlag has not been set, the shake state determination unit 114 sets InitFlag in step S202, sets 0 in a shake state determination counter ShakeLevelCnt in step S203, and then advances to step S204. Once InitFlag is set, the process branches to step S204 after the determination in step S201 in the next cycle. Note that this process starts when the image stabilizing operation is ON. When the image stabilizing operation is OFF, InitFlag is initialized, and when the image stabilizing operation starts, the determination in step S201 is performed again, and InitFlag is set in step S202.

If the shake state determination unit 114 determines in step S201 that InitFlag has been set, it advances to step S204 to calculate the absolute value GyroAbS of an angular velocity Gyro output from an HPF 103. If GyroABS is larger than a predetermined threshold Thresh1 in step S205, the shake state determination unit 114 advances to step S206. If ShakeLevelCnt is smaller than the upper limit value ShakeLimit of the shake state determination counter in step S206, the shake state determination unit 114 advances to step S207. In step S207, the shake state determination unit 114 adds a predetermined count-up value CntA to ShakeLevelCnt, ends the process, and waits for the next sampling cycle. If ShakeLevelCnt is equal to or larger than ShakeLimit in step S206, the shake state determination unit 114 ends the process and waits for the next sampling cycle.

If GyroABS is equal to or smaller than Thresh1 (equal to or smaller than the threshold) in step S205, the shake state determination unit 114 determines in step S208 whether ShakeLevelCnt is larger than 0. If ShakeLevelCnt is larger than 0, the shake state determination unit 114 subtracts a predetermined count-down value CntB from ShakeLevelCnt in step S209, ends the process, and waits for the next sampling cycle. If ShakeLevelCnt is equal to or smaller than 0 in step S208, the shake state determination unit 114 sets 0 in ShakeLevelCnt in step S210, ends the process, and waits for the next sampling cycle.

FIGS. 9A to 9C show time-series data of a shake level calculated by the shake state determination unit 114 in the second embodiment. FIG. 9A shows an angular velocity signal output from the HPF 103. FIG. 9B shows an angular velocity absolute value obtained by converting an angular velocity signal into an absolute value. FIG. 9C shows time-series data of ShakeLevelCnt described with reference to FIG. 8, which is a shake level output from the shake state determination unit 114 in the second embodiment.

The amplitude of the detected angular velocity is small during time $\Delta Time1$, and the camera shake is small because the user captures an image while holding the image capture apparatus with his hands not to shake it. The amplitude of the detected angular velocity is large during time $\Delta Time2$, and the camera shake is very large owing to image capturing during walking or the like. During time $\Delta Time3$, the amplitude of the angular velocity is an intermediate one between that during $\Delta Time1$ and that during $\Delta Time2$. During time $\Delta Time4$, the user intentionally moves the image capture apparatus to, for example, change its composition.

In this fashion, a shake level signal as shown in FIG. 9C can be detected by control processing in FIG. 8, and it can be detected whether the shake is large in an image capturing state such as image capturing during walking. Further, the shake level signal can be detected by a simple arrangement without using a filter arrangement like the shake state determination unit 114 in the first embodiment.

Third Embodiment

The operations of a shake state determination unit 114 and offset calculation unit 115 in the third embodiment of the present invention will be described. FIG. 10 is a block diagram showing the arrangement of a shake correction apparatus according to the third embodiment of the present invention.

The offset calculation unit 115 generates a signal for returning the shake correction amount to the correction center position in accordance with a shake level from the shake state determination unit 114, and a shake correction amount calculated by a target position calculation unit 108. Then, the offset calculation unit 115 outputs the signal to a subtracter 104 serving as an offset application means.

The shake correction amount of a preceding cycle that is calculated by the target position calculation unit 108 is input to an offset table 301, outputting an offset value corresponding to a set table. The offset table 301 is a 1-input 1-output table.

Figure 11:
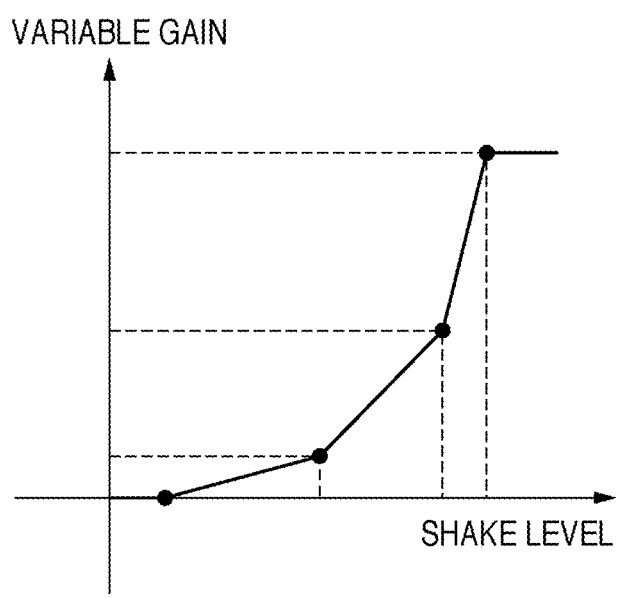
FIG. 11 is a graph for explaining the operation of a variable gain calculation unit shown in FIG. 10.

After that, a variable gain calculation unit 302 calculates, based on the shake level from the shake state determination unit 114, a gain to be added to an offset value output from the offset table 301. For example, the variable gain is set as shown in FIG. 11. The offset value is multiplied by a variable gain 303, outputting the resultant offset value to the subtracter 104 serving as an offset application means.

According to the third embodiment, an offset amount corresponding to the shake level can be calculated. The shake correction effect can be optimized within the movable range of image blur correction in both a state in which the shake is large during walking or the like, and a state in which the shake is small. A 3D offset table as in the first embodiment need not be adopted, and the image stabilizing effect can be optimized by using a 1-input 1-output 2D offset table and one variable gain without increasing the ROM capacity for the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-024827, filed Feb. 5, 2010, which is hereby incorporated by reference herein in its entirety.

What is claimed is:

1. An image blur correction apparatus comprising:
a shake detection unit which detects a shake;
a calculation unit which calculates an image blur correction amount that is data for correcting an image blur which is caused by the shake and is obtained by integrating output signal of said shake detection unit that is speed data detected by said shake detection unit by an integration unit;
an image blur correction unit which corrects the image blur based on the image blur correction amount calculated by said calculation unit;
a shake level determination unit which determines a shake level of an image capturing apparatus based on an output of said shake detection unit;
a subtraction unit which subtracts an offset value, which is speed data for returning said image blur correction unit to a center of a movable range of said image blur correction unit, from speed data output from said shake detection unit; and
a changing unit which changes the offset value based on the image blur correction amount and the shake level.

2. The apparatus according to claim 1, wherein in a case that the image blur correction amount is larger than a predetermined value, said changing unit sets the offset value larger than the offset value which is set in a case that the image blur correction amount is not larger than the predetermined value.

3. The apparatus according to claim 1, wherein in a case that the shake level is larger than a predetermined value, said changing unit sets the offset value larger than the offset value which is set in a case that the shake level is not larger than the predetermined value.

4. An optical apparatus comprising the image blur correction apparatus according to claim 1.

5. An image capturing apparatus comprising the image blur correction apparatus according to claim 1.

6. A method of controlling an image blur correction apparatus comprising:
a shake detection step of detecting a shake;
a calculation step of calculating an image blur correction amount that is data for correcting an image blur which is caused by the shake and is obtained by integrating output signal of said shake detection unit that is speed data detected by said shake detection step;
an image blur correction step of correcting the image blur based on the image blur correction amount calculated by said calculation step by an image blur correction unit;
a shake level determination step of determining a shake level of an image capturing apparatus based on an output of said shake detection step;
a subtraction step of subtracting an offset value, which is speed data for returning the image blur correction unit to a center of a movable range of the image blur correction unit, from speed data output from said shake detection step; and
a changing step of changing the offset value based on the image blur correction amount and the shake level.

7. A shake correction apparatus comprising:
a shake detection unit which detects a shake;
a calculation unit which calculates a shake correction amount for correcting an image blur based on an output from said shake detection unit;
a shake correction unit which corrects the image blur based on the shake correction amount;
a shake level determination unit which determines a shake level of the shake based on an output from said shake detection unit;
an offset determination unit which determines an offset value based on the shake correction amount and the shake level; and
a subtraction unit which subtracts the offset value from the output from said shake detection unit,
wherein the offset value is data for returning said shake correction unit to a center of a movable range of said shake correction unit, and
wherein said offset determination unit increases the offset value in a case where the shake level is larger than a predetermined level comparing with a case where the shake level is equal to or smaller than the predetermined level, in a whole area of a movable range of image blur correction of the shake correction unit.

8. The apparatus according to claim 7, wherein the case where the shake level is larger than the predetermined level corresponds to moving image capturing during walking and the case where the shake level is equal to or smaller than the predetermined level corresponds to handheld moving image capturing.

9. The apparatus according to claim 7, wherein in the case where the shake level is larger than the predetermined level, said offset determination unit determines the offset value such that the shake correction amount falls within a range in which said shake correction unit can move.

10. A method of controlling a shake correction apparatus including a shake correction unit which corrects an image blur, the method comprising:
a shake detection step of detecting a shake;
a calculation step of calculating a shake correction amount for correcting an image blur based on an output from the shake detection step;
a shake correction step of driving the shake correction unit based on the shake correction amount;
a shake level determination step of determining a shake level of the shake based on an output from the shake detection step;
an offset determination step of determining an offset value based on the shake correction amount and the shake level; and
a subtraction step of subtracting the offset value from the output from the shake detection step,
wherein the offset value is data for returning said shake correction unit to a center of a movable range of said shake correction unit, and
wherein said offset determination step increases the offset value in a case where the shake level is larger than a predetermined level comparing with a case where the shake level is equal to or smaller than the predetermined level, in a whole area of a movable range of image blur correction of the shake correction unit.

11. An image blur correction apparatus comprising:
a shake detection unit which detects a shake;
a calculation unit which calculates an image blur correction amount that is data for correcting an image blur which is caused by the shake and is obtained by integrating output signal of said shake detection unit that is speed data detected by said shake detection unit by an integration unit;

an image blur correction unit which corrects the image blur based on the image blur correction amount calculated by said calculation unit;

a shake level determination unit which determines a shake level of an image capturing apparatus based on an output of said shake detection unit;

a subtraction unit which subtracts an offset value, which is speed data for moving returning said image blur correction unit to a center of a movable range of said image blur correction unit, from speed data output from said shake detection unit; and a changing unit which changes the offset value based on the image blur correction amount and the shake level, in a whole area of a movable range of said image blur correction unit.

12. The apparatus according to claim 11, wherein in a case that the image blur correction amount is larger than a predetermined value, said changing unit sets the offset value larger than the offset value which is set in a case that the image blur correction amount is not larger than the predetermined value.

13. The apparatus according to claim 11, wherein in a case that the shake level is larger than a predetermined value, said changing unit sets the offset value larger than the offset value which is set in a case that the shake level is not larger than the predetermined value.

14. An optical apparatus comprising the image blur correction apparatus according to claim 11.

15. An image capturing apparatus comprising the image blur correction apparatus according to claim 11.

16. A method of controlling an image blur correction apparatus comprising:

a shake detection step of detecting a shake;

a calculation step of calculating an image blur correction amount that is data for correcting an image blur which is caused by the shake and is obtained by integrating output signal of said shake detection unit that is speed data detected by said shake detection step;

an image blur correction step of correcting the image blur based on the image blur correction amount calculated by said calculation step by an image blur correction unit;

a shake level determination step of determining a shake level of an image capturing apparatus based on an output of said shake detection step;

a subtraction step of subtracting an offset value, which is speed data for returning the image blur correction unit to a center of a movable range of the image blur correction unit, from speed data output from said shake detection step; and a changing step of changing the offset value based on the image blur correction amount and the shake level, in a whole area of a movable range of the image blur correction unit.

* * * * *